(12) United States Patent
Fang et al.

(10) Patent No.: US 10,817,011 B2
(45) Date of Patent: Oct. 27, 2020

(54) ROTATING DEVICE

(71) Applicant: PEGATRON CORPORATION, Taipei (TW)

(72) Inventors: Chao-Yu Fang, Taipei (TW); Chun-Liang Chen, Taipei (TW)

(73) Assignee: PEGATRON CORPORATION, Taipei (TW)

(*) Notice: Subject to any disclaimer, the term of this patent is extended or adjusted under 35 U.S.C. 154(b) by 0 days.

(21) Appl. No.: 16/590,994

(22) Filed: Oct. 2, 2019

(65) Prior Publication Data
US 2020/0166961 A1 May 28, 2020

(30) Foreign Application Priority Data

Nov. 26, 2018 (CN) .......................... 2018 1 1415406

(51) Int. Cl.
*G05G 5/04* (2006.01)
*F16D 71/00* (2006.01)

(52) U.S. Cl.
CPC ............... *G05G 5/04* (2013.01); *F16D 71/00* (2013.01)

(58) Field of Classification Search
CPC .................................. G05G 5/04; F16D 71/00
See application file for complete search history.

(56) References Cited

U.S. PATENT DOCUMENTS

| | | | | |
|---|---|---|---|---|
| 3,012,447 A * | 12/1961 | Wallace | ................... | G05G 5/04 74/526 |
| 3,411,366 A * | 11/1968 | Leto | ......................... | G05G 5/04 74/10.2 |
| 4,794,814 A * | 1/1989 | Ferguson, Jr. | ........... | G05G 5/04 74/526 |
| 2016/0201775 A1 | 7/2016 | Gitnes | | |
| 2017/0351292 A1* | 12/2017 | Stoufer | .................... | G05G 5/04 |

FOREIGN PATENT DOCUMENTS

| | | |
|---|---|---|
| CN | 207164629 U | 3/2018 |
| TW | M375792 U | 3/2010 |

OTHER PUBLICATIONS

Taiwan Office Action dated Mar. 6, 2020, issued in patent application No. 10920215080.
European Search Report issued in corresponding European patent application dated Apr. 23, 2020.

* cited by examiner

*Primary Examiner* — Vicky A Johnson
(74) *Attorney, Agent, or Firm* — McClure, Qualey & Rodack, LLP (57) ABSTRACT

The application provides a rotating device, including: an annular base, a first positioning member, a second positioning member, and a driving member. The driving member includes a pushing structure. The driving member drives the pushing structure to rotate around the outer edge of the peripheral portion in a first rotating direction or a second rotating direction; when the pushing structure rotates in the first rotating direction, the first stop portion and the third stop portion fit the peripheral portion in response to the push of the pushing structure, and the second stop portion and the fourth stop portion stop the pushing structure; and when the pushing structure rotates in the second rotating direction, the second stop portion and the fourth stop portion fit the peripheral portion in response to the push of the pushing structure, and the first stop portion and the third stop portion stop the pushing structure.

12 Claims, 6 Drawing Sheets

ROTATING DEVICE

CROSS-REFERENCE TO RELATED APPLICATION

This non-provisional application claims priority under 35 U.S.C. § 119(a) to Patent Application No. 201811415406.0 filed in China, P.R.C. on Nov. 26, 2018, the entire contents of which are hereby incorporated by reference.

BACKGROUND

Technical Field

The application relates to a rotating device, and more particularly to a rotating device limited to rotate within a certain range.

Related Art

Nowadays, many devices use rotating function, e.g., robots, monitors, etc., which often need to be able to rotate 360 degrees or more. However, the robot or the monitor is still provided with wires for power supply or signal transmission, and therefore is not allowed to rotate in a single direction without limitation. Hence, it is necessary to provide a rotating device limited to rotate within a certain rotating angle.

Some existing rotating devices require a multi-layer structure to limit specific angle ranges of different rotating directions with different layers, but the rotating devices with such a structure is thick and large and even inconvenient to manufacture and assemble due to many components.

SUMMARY

In view of this, the application provides a rotating device, which mainly aims to achieve rotation limitation with a simple and small structure.

To achieve the objective, a rotating device according to an embodiment of the application comprises: an annular base, a first positioning member, a second positioning member, and a driving member. The first positioning member is pivoted to a peripheral portion of the annular base and comprises a first stop portion and a second stop portion connected to the first stop portion, the first stop portion is bent in a first rotating direction, and the second stop portion is bent in a second rotating direction. The second positioning member is pivoted to the peripheral portion of the annular base and comprises a third stop portion and a fourth stop portion connected to the third stop portion, the third stop portion is bent in the first rotating direction, and the fourth stop portion is bent in the second rotating direction. The driving member is rotatably assembled to the annular base, and comprises a pushing structure. The pushing structure protrudes from the peripheral portion, and the driving member is driven by a force to drive the pushing structure to rotate around the outer edge of the peripheral portion in the first rotating direction or the second rotating direction; when the pushing structure rotates in the first rotating direction, the first stop portion and the third stop portion fit the peripheral portion in response to the push of the pushing structure, and the second stop portion and the fourth stop portion stop the pushing structure; and when the pushing structure rotates in the second rotating direction, the second stop portion and the fourth stop portion fit the peripheral portion in response to the push of the pushing structure, and the first stop portion and the third stop portion stop the pushing structure.

Thus, by providing the first positioning member and the second positioning member as a stop positioning structure, the driving member rotates within a specific range relative to the annular base, but after a certain angle of rotation in each rotating direction, the pushing structure of the driving member does not continue to rotate with the stop of the first positioning member or the second positioning member. Therefore, the rotating device is limited to rotate within a certain rotation angle. An upper and lower double-layer structure or an upper and lower multi-layer structure is not needed, so that the rotating device is made thin. In addition, only the first positioning member and the second positioning member are needed to be arranged on the peripheral portion of the annular base, the pushing structure of the driving member is made to rotate around the annular base, and if the annular base is miniaturized, the first positioning member, the second positioning member and the driving member are also correspondingly miniaturized, so that the overall size is reduced.

In some embodiments, when the first stop portion fits the peripheral portion of the annular base, the second stop portion moves away from and protrudes from the peripheral portion; when the second stop portion fits the peripheral portion of the annular base, the first stop portion moves away from and protrudes from the peripheral portion; when the third stop portion fits the peripheral portion of the annular base, the fourth stop portion moves away from and protrudes from the peripheral portion; and when the fourth stop portion fits the peripheral portion of the annular base, the third stop portion moves away from and protrudes from the peripheral portion. That is to say, when one of the first stop portion and the second stop portion fits the peripheral portion of the annular base, the other one moves away from and protrudes from the peripheral portion of the annular base. The third stop portion and the fourth stop portion are also the same, when one of the third stop portion and the fourth stop portion fits the peripheral portion of the annular base, the other one moves away from and protrudes from the peripheral portion of the annular base.

In some embodiments, when the pushing structure rotates in the first rotating direction and the second stop portion fits the peripheral portion, the pushing structure passes through the second stop portion and pushes the first stop portion, and after the first stop portion fits the peripheral portion of the annular base, in response to the third stop portion or the fourth stop portion to fit the peripheral portion, the pushing structure is stopped at the fourth stop portion or pushes the third stop portion, so that the third stop portion fits the peripheral portion of the annular base; and when the pushing structure rotates in the second rotating direction and the third stop portion fits the peripheral portion, the pushing structure passes through the third stop portion and pushes the fourth stop portion, and after the fourth stop portion fits the peripheral portion of the annular base, in response to the second stop portion or the first stop portion to fit the peripheral portion, the pushing structure is stopped at the first stop portion or pushes the second stop portion, so that the second stop portion fits the peripheral portion of the annular base.

In some embodiments, the peripheral portion of the annular base is recessed with two receiving grooves, a pivot is arranged in each receiving groove in a protruding manner, and the first positioning member and the second positioning member are respectively received in the receiving grooves and pivoted to the pivots and rotate about the pivots. By providing the receiving grooves, the overall outer diameter of the rotating device are made small.

In some embodiments, when fitting the peripheral portion of the annular base, the first stop portion, the second stop portion, the third stop portion or the fourth stop portion is completely received in the corresponding receiving grooves, and does not protrude from the peripheral portion. Thus, the driving member is closer to the peripheral portion when rotating along the peripheral surface and the overall size of the rotating device is reduced as much as possible.

In some embodiments, the minimum linear distance from the center of the annular base to the inner surface of the pushing structure is shorter than the linear distance from the center of the annular base to the end of the first stop portion of the first positioning member when the second stop portion of the first positioning member fits the peripheral portion of the annular base, and shorter than the linear distance from the center of the annular base to the end of the fourth stop portion of the second positioning member when the third stop portion of the second positioning member fits the peripheral portion of the annular base. Alternatively, in some embodiments, the minimum linear distance from the center of the annular base to the inner surface of the pushing structure is shorter than the linear distance from the center of the annular base to the end of the second stop portion of the first positioning member when the first stop portion of the first positioning member fits the peripheral portion of the annular base, and shorter than the linear distance from the center of the annular base to the end of the third stop portion of the second positioning member when the fourth stop portion of the second positioning member fits the peripheral portion of the annular base. In this way, the stop portions effectively stop the pushing structure.

In some embodiments, the first stop portion, the second stop portion, the third stop portion and the fourth stop portion are arc-shaped, and have radians corresponding to the peripheral portion of the annular base. After pushed by the pushing structure to move, the respective stop portions fit the peripheral portion of the annular base, so that the pushing structure moves more smoothly.

In some embodiments, the included angle between the first stop portion and the second stop portion and the included angle between the third stop portion and the fourth stop portion are more than or equal to 90 degrees. In this way, the pushing structure slides smoothly between the stop portions and pushes the positioning members to rotate.

In some embodiments, the driving member further comprises a pivot shaft and an extending portion, the pivot shaft is rotatably pivoted to the annular base, one end of the extending portion is connected to the pivot shaft, and the other end is connected to the pushing structure. The pivot shaft is pivoted to the annular base, and the pushing structure is extended to the peripheral portion of the annular base under the connection of the extending portion, so that the size of the driving member is reduced, and needed materials and overall weight are also reduced.

In some embodiments, the driving member further comprises a disc, a pivot shaft, and an extending portion. The pivot shaft is arranged in the center of the disc, and the pivot shaft penetrates through the annular base such that the disc is rotatably arranged on the annular base. One end of the extending portion is connected to the disc, and the other end is connected to the pushing structure. Through the disc, the driving member is more stable when rotating relative to the annular base, and the force that the driving member bears is enhanced to prevent the extending portion from being broken under excessive force.

In some embodiments, the diameter of the disc is smaller than that of the annular base, so that the driving member is still arranged within the annular base to relatively miniaturize the entire size.

Details regarding other effects and embodiments of the application are described below with reference to the drawings.

BRIEF DESCRIPTION OF THE DRAWINGS

To describe technical solutions in the embodiments of the application or in the prior art more clearly, the following briefly introduces the drawings needed for describing the embodiments or the prior art. Apparently, the accompanying drawings in the following description show only some embodiments of the application, and a person of ordinary skill in the art still derives other drawings from these drawings without creative efforts.

DETAILED DESCRIPTION OF THE EMBODIMENTS

In order to make the objectives, features and effects of the application more comprehensible, the following provides embodiments and drawings for describing the application in detail.

Figure 1:
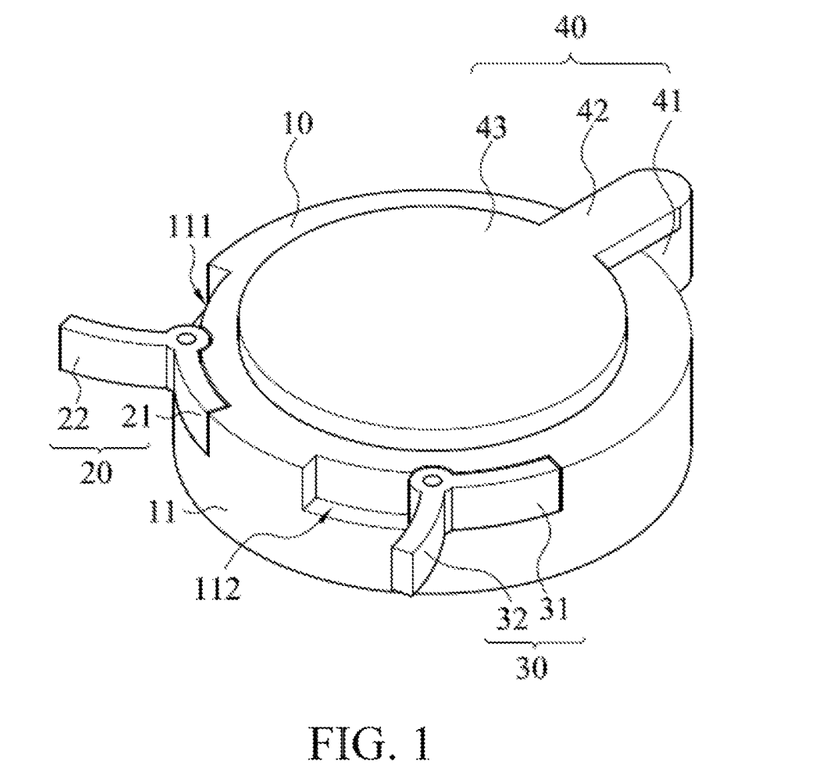
FIG. 1 is a schematic diagram of an embodiment of a rotating device according to the application.
Figure 2:
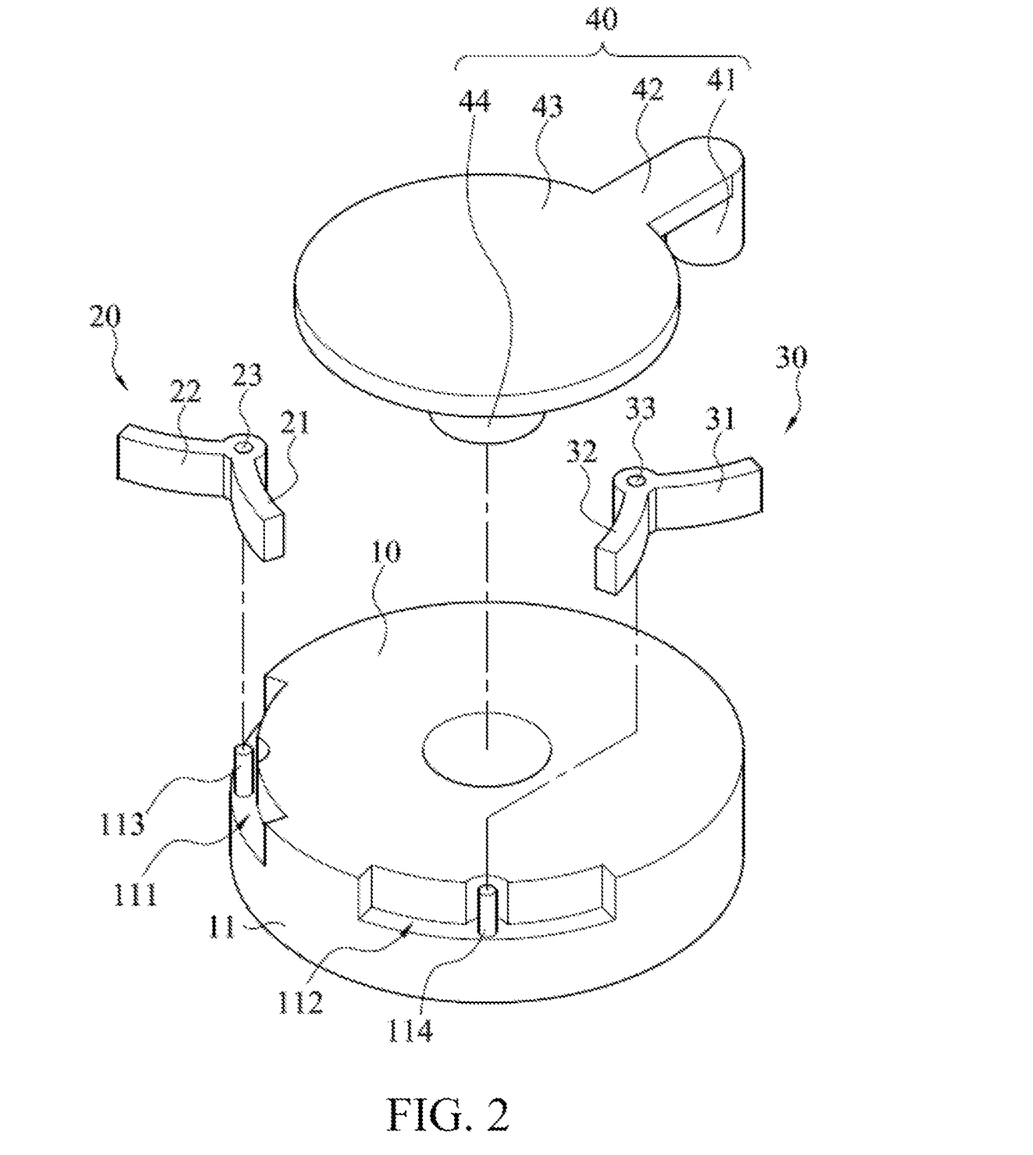
FIG. 2 is an exploded view of an embodiment of the rotating device according to the application.

Referring to FIG. 1 and FIG. 2, FIG. 1 is a schematic diagram of an embodiment of a rotating device according to the application, and FIG. 2 is an exploded view of an embodiment of the rotating device according to the application. As shown in FIG. 1, the rotating device of the embodiment includes an annular base 10, a first positioning member 20, a second positioning member 30, and a driving member 40. In the embodiment, the annular base 10 is a circular base, two receiving grooves 111 and 112 are recessed in a peripheral portion 11, and pivots 113 and 114 are arranged in the centers of the two receiving grooves 111 and 112 in a protruding manner. The first positioning member 20 is pivoted to the pivot 113 and rotates about the pivot 113. The second positioning member 30 is pivoted to the pivot 114 and rotates about the pivot 114.

Figure 3:
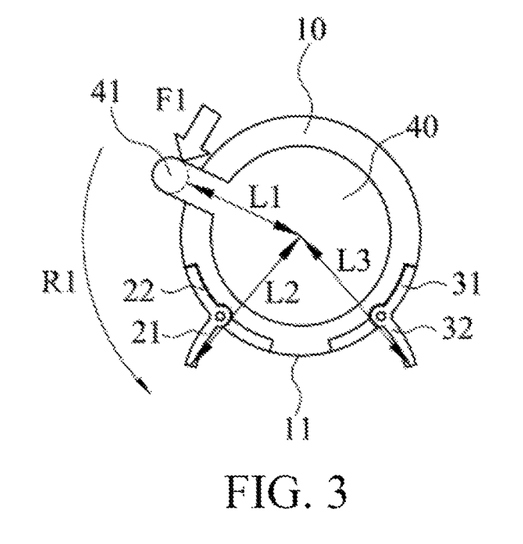
FIG. 3 to FIG. 5 are schematic diagrams showing the rotation of a driving member, under a force, of the rotating device in a first rotating direction according to the application.

The first positioning member 20 is pivoted to the peripheral portion 11 of the annular base 10. According to FIG. 1 and FIG. 2, the first positioning member 20 includes a first stop portion 21 and a second stop portion 22 connected to the first stop portion, the first stop portion 21 is bent in a first rotating direction, and the second stop portion 22 is bent in a second rotating direction. A shaft hole 23 is provided at the joint of the first stop portion 21 and the second stop portion 22. By utilizing the shaft hole 23, the first positioning member 20 penetrates through the pivot 113 in the receiving groove 111 and is pivoted to the peripheral portion 11 of the annular base 10. After the first positioning member 20 is pivoted, the first positioning member 20 rotates about the pivot 113, and the first positioning member 20 selectively enables the first stop portion 21 and the second stop portion 22 to fit the peripheral portion 11 of the annular base 10. As shown in FIG. 1, the first stop portion 21 is rotatably received in the receiving groove 111 to fit the peripheral portion 11 of the annular base 10. In the embodiment, when fitting the peripheral portion 11 of the annular base 10, the first stop portion 21 is completely received in the receiving groove 111, and does not protrude from the peripheral portion 11. According to FIG. 1, when the first stop portion 21 fits the peripheral portion 11, the outer surface of the first stop portion 21 and the surface of the peripheral portion 11 are the same surface in smooth connection, and the outer surface of the first stop portion 21 does not protrude from and is not recessed in the surface of the peripheral portion 11. Similarly, as shown in FIG. 3, when fitting the peripheral portion 11, the second stop portion 22 achieves the same effect as the first stop portion 21.

Figure 11:
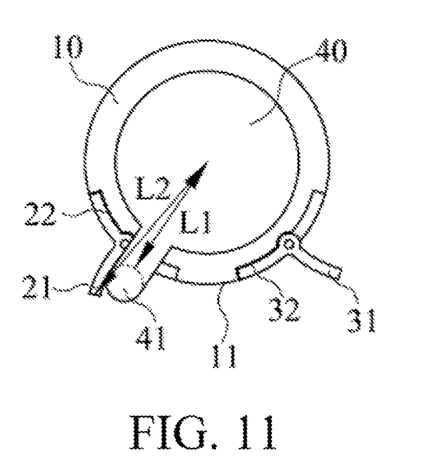

The second positioning member 30 is pivoted to the peripheral portion 11 of the annular base 10. According to FIG. 1 and FIG. 2, the second positioning member 30 includes a third stop portion 31 and a fourth stop portion 32 connected to the third stop portion, the third stop portion 31 is bent in the first rotating direction, and the fourth stop portion 32 is bent in the second rotating direction. A shaft hole 33 is provided at the joint of the third stop portion 31 and the fourth stop portion 32. By utilizing the shaft hole 33, the second positioning member 30 penetrates through the pivot 114 in the receiving groove 112 and is pivoted to the peripheral portion 11 of the annular base 10. After the second positioning member 30 is pivoted, the second positioning member 30 rotates about the pivot 114, and the second positioning member 30 selectively enables the third stop portion 31 and the fourth stop portion 32 to fit the peripheral portion 11 of the annular base 10. As shown in FIG. 1, the third stop portion 31 is rotatably received in the receiving groove 112 to fit the peripheral portion 11 of the annular base 10. In the embodiment, when fitting the peripheral portion 11 of the annular base 10, the third stop portion 31 is completely received in the receiving groove 111, and does not protrude from the peripheral portion 11. According to FIG. 1, when the third stop portion 31 fits the peripheral portion 11, the outer surface of the third stop portion 31 and the surface of the peripheral portion 11 are the same surface in smooth connection, and the outer surface of the third stop portion 31 does not protrude from and is not recessed in the surface of the peripheral portion 11. Similarly, as shown in FIG. 11, when fitting the peripheral portion 11, the fourth stop portion 32 achieves the same effect as the third stop portion 31.

The driving member 40 is rotatably assembled to the annular base 10. In the embodiment, the driving member 40 includes a pushing structure 41, a disc 43, a pivot shaft 44, and an extending portion 42. The pivot shaft 44 is arranged in the center of the disc 43, and the pivot shaft 44 penetrates through the annular base 10 such that the disc 43 is rotatably arranged on the annular base 10. One end of the extending portion 42 is connected to the disc 43 and the other end is connected to the pushing structure 41. The pushing structure 41 protrudes from the peripheral portion 11. Through the disc 43, the driving member 40 is more stable when rotating relative to the annular base 10, and the force that the driving member 40 bears is enhanced to prevent the extending portion 42 from being broken under excessive force. Moreover, in the embodiment, the diameter of the disc 43 is smaller than that of the annular base 10, so that most components of the driving member 40 are arranged within the annular base 10 to miniaturize the entire size.

In other embodiments, in the structure with less stress or more miniaturization, the disc 43 is omitted, only the pivot shaft and the extending portion are provided, and two ends of the extending portion are respectively connected to the pivot shaft and the pushing structure. The pivot shaft is directly pivoted to the annular base, and the pushing structure is extended to the peripheral portion of the annular base under the connection of the extending portion, so that the size of the driving member is reduced, and needed materials and overall weight are also reduced.

The driving member 40 is driven by a force to drive the pushing structure 41 to rotate around the outer edge of the peripheral portion 11 in the first rotating direction or the second rotating direction. Referring to FIG. 3 to FIG. 9, FIG. 3 to FIG. 5 are schematic diagrams showing the rotation of the driving member, under a force, of the rotating device in a first rotating direction according to the application. FIG. 6 to FIG. 11 are schematic diagrams showing the rotation of the driving member, under a force, of the rotating device in a second rotating direction according to the application. The following describes the rotation limitation of the rotating device with reference to FIG. 3 to FIG. 11.

Figure 4:
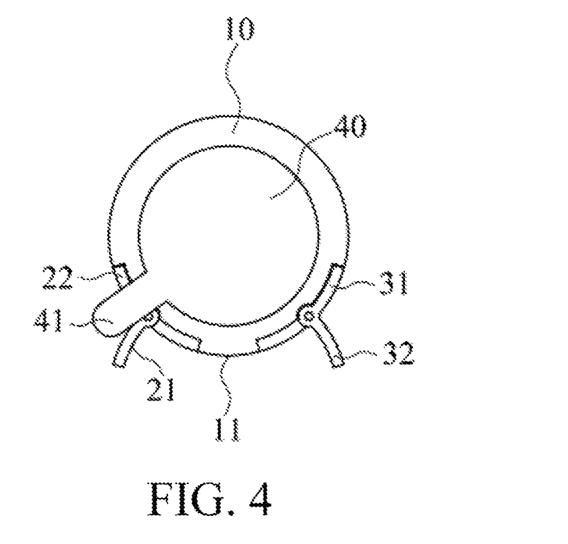

According to FIG. 3, when the second stop portion 22 fits the peripheral portion 11, the pushing structure 41 of the driving member 40 rotates in the first rotating direction R1 with the push of the force F1. As shown in FIG. 4, the pushing structure 41 rotates to a position between the first stop portion 21 and the second stop portion 22 of the first positioning member 20, and is continuously rotated under the force in the first rotating direction R1.

Figure 5:
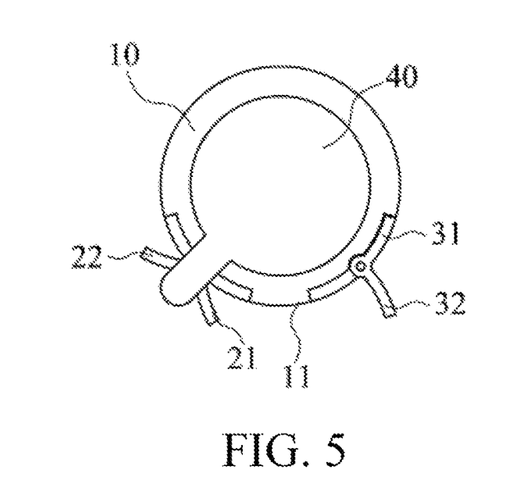
Figure 6:
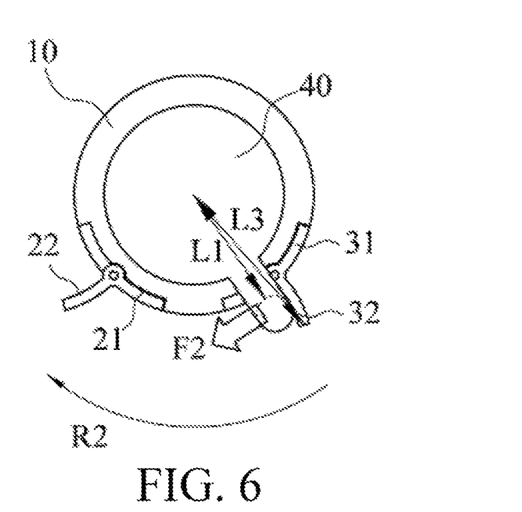
FIG. 6 to FIG. 11 are schematic diagrams showing the rotation of the driving member, under a force, of the rotating device in a second rotating direction according to the application.

Subsequently, as shown in FIG. 5, the pushing structure 41 pushes against the first stop portion 21 of the first positioning member 20, so that the first stop portion 21 is pushed by the driving member 40 in the first rotating direction R1 to rotate. The first stop portion 21 is pushed to fit the peripheral portion 11 in response to the push of the pushing structure 41, and the driving member 40 is continuously rotated by the force F1 in the first rotating direction R1 and passes through the first stop portion 21. In the embodiment, because the third stop portion 31 of the second positioning member 30 fits the peripheral portion 11, when the pushing structure 41 is continuously rotated by the force F1 in the first rotating direction R1, the driving member 40 is stopped at the fourth stop portion 32 of the second positioning member 30, as shown in FIG. 6. At this time, the driving member 40 does not continue to rotate in the first rotating direction R1.

According to FIG. 3 to FIG. 6, when the first stop portion 21 fits the peripheral portion 11 of the annular base 10, the second stop portion 22 moves away from and protrudes from the peripheral portion 11, and when the second stop portion 22 fits the peripheral portion 11 of the annular base 10, the first stop portion 21 moves away from and protrudes from the peripheral portion 11. Similarly, when the third stop portion 31 fits the peripheral portion 11 of the annular base 10, the fourth stop portion 32 moves away from and protrudes from the peripheral portion 11, and when the fourth stop portion 32 fits the peripheral portion 11 of the annular base 10, the third stop portion 31 moves away from and protrudes from the peripheral portion 11.

Figure 7:
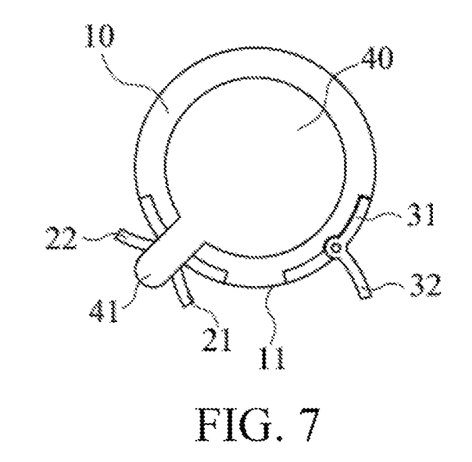
Figure 8:
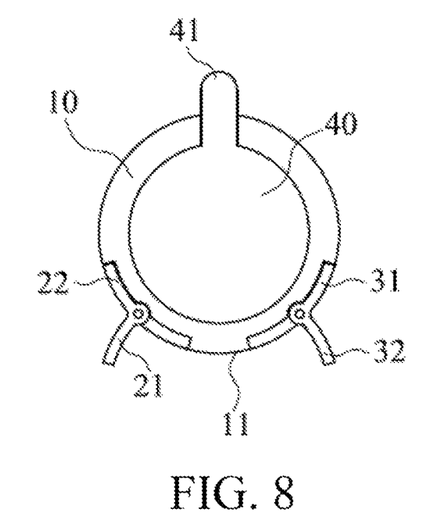
Figure 9:
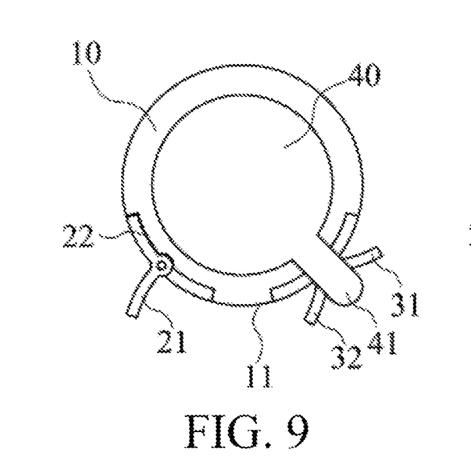
Figure 10:
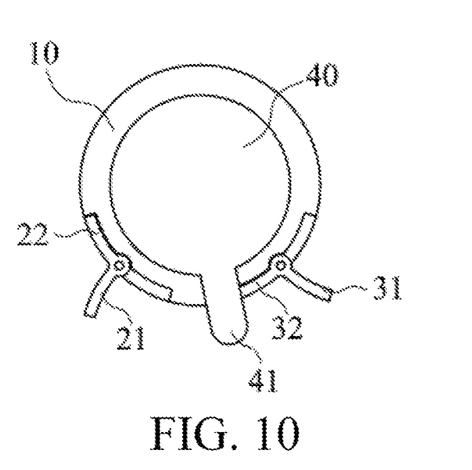

Subsequently, as shown in FIG. 6, the pushing structure 41 of the driving member 40 is pushed by the force F2 to rotate in the second rotating direction R2. As shown in FIG. 7 and FIG. 8, when the pushing structure 41 continues to rotate in the second rotating direction R2, the pushing structure 41 pushes against the second stop portion 22 of the first positioning member 20, and the second stop portion 22 fits the peripheral portion 11 in response to the push of the pushing structure 41. Subsequently, the force F2 is still continuously applied to the pushing structure 41 such that the pushing structure 41 continues to rotate in the second rotating direction R2. As shown in FIG. 8 to FIG. 10, since the third stop portion 31 fits the peripheral portion 11, the pushing structure 41 of the driving member 40 passes through the third stop portion 31 and rotates in the second rotating direction R2 to push against and pass through the fourth stop portion 32 of the second positioning member 30. At this time, the fourth stop portion 32 fits the peripheral portion 11 in response to the push of the pushing structure 41, and the driving member 40 is continuously rotated by the force F2 in the second rotating direction R2 and passes through the fourth stop portion 32. The second stop portion 22 fits the peripheral portion 11, and the first stop portion 21 moves away from and protrudes from the peripheral portion 11, so that the pushing structure 41 is stopped at the first stop portion 21 of the first positioning member 20, as shown in FIG. 11.

In addition, according to the embodiment, the first stop portion 21 only receives the push of the pushing structure 41 in the first rotating direction R1 (as shown in FIG. 3) and rotates to fit the peripheral portion 11 (as shown in FIG. 6). The second stop portion 22 only receives the push of the pushing structure 41 in the second rotating direction R2 (as shown in FIG. 6 and FIG. 7) and rotates to fit the peripheral portion 11 (as shown in FIG. 8). The third stop portion 31 only receives the push of the pushing structure 41 in the first rotating direction R1 and rotates to fit the peripheral portion 11, and the fourth stop portion 32 only receives the push of the pushing structure 41 in the second rotating direction R2 (shown in FIG. 8 and FIG. 9) and rotates to fit the peripheral portion 11 (as shown in FIG. 10).

By providing the first positioning member 20 and the second positioning member 30 as a stop positioning structure, the driving member 40 rotates within a specific range relative to the annular base 10, but after a certain angle of rotation in each rotating direction, the pushing structure 41 of the driving member 40 does not continue to rotate under the stop of the first positioning member 20 or the second positioning member 30. Therefore, the rotating device is limited to rotate within a certain rotation angle. An upper and lower double-layer structure or an upper and lower multi-layer structure is not needed in the embodiment, so that the rotating device is made thin. In addition, only the first positioning member 20 and the second positioning member 30 are needed to be arranged on the peripheral portion 11 of the annular base 10, the pushing structure 41 of the driving member 40 rotates around the annular base 10, and if the annular base 10 is miniaturized, the first positioning member 20, the second positioning member 30 and the driving member 40 are also miniaturized, so that the overall size is reduced. Moreover, this structure is provided with only four components, which do not need to be fixed by using additional fixing components such as screws during assembling, thereby effectively simplifying the manufacturing process and components.

Next, referring to FIG. 1 and FIG. 2 again, in the embodiment, the first stop portion 21, the second stop portion 22, the third stop portion 31 and the fourth stop portion 32 are arc-shaped, and have radians corresponding to the peripheral portion 11 of the annular base 10. When pushed and moved to be received in the receiving grooves 111 and 112 as shown in FIG. 1, the first stop portion 21 and the third stop portion 31 fit the peripheral portion 11 of the annular base 10 better, so that the movement in FIG. 3 to FIG. 11 is smoother.

In addition, according to FIG. 2, in the embodiment, the included angle between the first stop portion 21 and the second stop portion 22 is more than 90 degrees, and the included angle between the third stop portion 31 and the fourth stop portion 32 is also more than 90 degrees. Thus, when the pushing structure 41 is to pass through the first positioning member 20 or the second positioning member 30 as shown in FIG. 5 and FIG. 9, the pushing structure 41 bears a small resistance, and easily passes through the first positioning member 20 or the second positioning member 30. In other implementation patterns, the included angle between the first stop portion 21 and the second stop portion 22 or the included angle between the third stop portion 31 and the fourth stop portion 32 are also equal to 90 degrees.

Next, referring to FIG. 3, the minimum linear distance from the center of the annular base 10 to the inner surface of the pushing structure 41 is L1. When the second stop portion 22 of the first positioning member 20 fits the peripheral portion 11 of the annular base 10, the linear distance from the center of the annular base 10 to the end of the first stop portion 21 of the first positioning member 20 is L2. When the third stop portion 31 of the second positioning member 30 fits the peripheral portion 11 of the annular base 10, the linear distance from the center of the annular base 10 to the end of the fourth stop portion 32 of the second positioning member 30 is L3.

In the embodiment, L1 is smaller than L3, so that when the pushing structure 41 is stopped at the fourth stop portion 32 of the second positioning member 30 as shown in FIG. 6, the fourth stop portion 32 effectively stops the pushing structure 41. In addition, L1 is smaller than L2, so that when the pushing structure 41 is stopped at the first stop portion 21 of the first positioning member 20 as shown in FIG. 11, the first stop portion 21 effectively stops the pushing structure 41.

Figure 12:
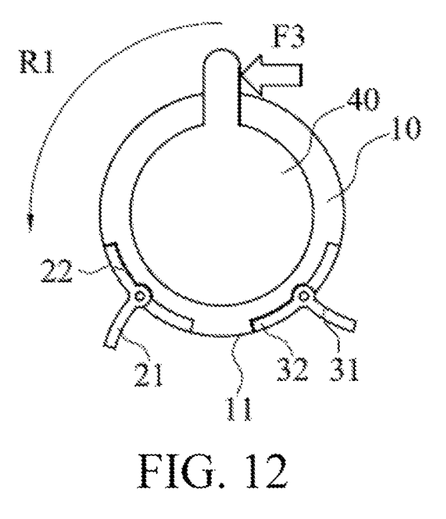
FIG. 12 to FIG. 16 are schematic diagrams showing the rotation of the driving member, under a force, of the rotating device in another pattern according to the application.

Next, FIG. 12 to FIG. 16 are referred to, which are schematic diagrams showing the rotation of the driving member, under a force, of the rotating device in another pattern according to the application. In another pattern of the embodiment, the pushing structure 41 of the driving member 40 is set to stop at the third stop portion 31 of the second positioning member 30 at an initial position. As shown in FIG. 12, the pushing structure 41 of the driving member 40 is first moved to a position between the first positioning member 20 and the second positioning member 30, without contacting any positioning member. Then, the second positioning member 30 is rotated such that the fourth stop portion 32 of the second positioning member 30 fits the peripheral portion 11 of the annular base 10, and the first positioning member 20 is rotated such that the second stop portion 22 of the first positioning member 20 fits the peripheral portion 11 of the annular base 10.

Figure 13:
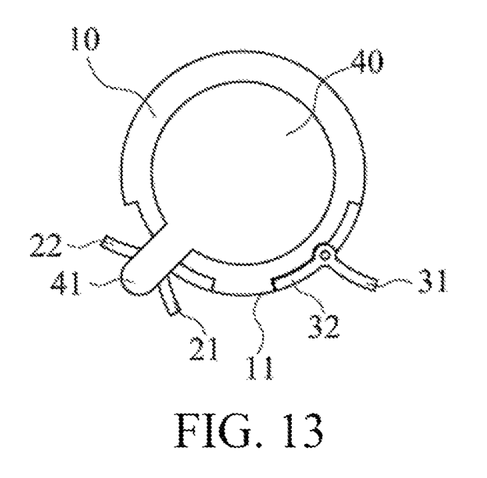

According to FIG. 12, when the pushing structure 41 is at a position shown in FIG. 12, and the second stop portion 22 and the fourth stop portion 32 both fit the peripheral portion 11, a force F3 is applied to the driving member 40 to drive the driving member 40 to rotate in the first rotating direction R1, because the second stop portion 22 fits the peripheral portion 11, the pushing structure 41 of the driving member 40 is pushed to pass through the first stop portion 21 of the first positioning member 20 (as shown in FIG. 13). Then, because the fourth stop portion 32 fits the peripheral portion 11, the pushing structure 41 is pushed to pass through the third stop portion 31 of the second positioning member 30 (as shown in FIG. 14) till stopping at the second stop portion 22 of the first positioning member 20 as shown in FIG. 15.

Figure 15:
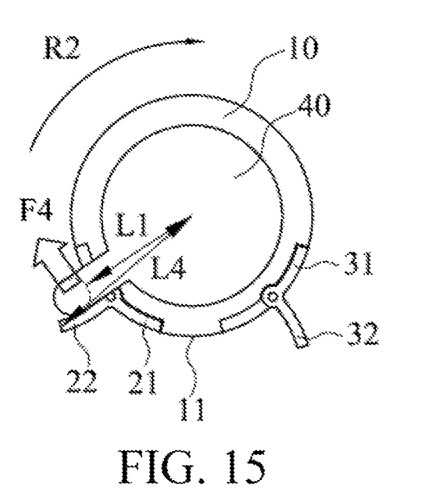
Figure 16:
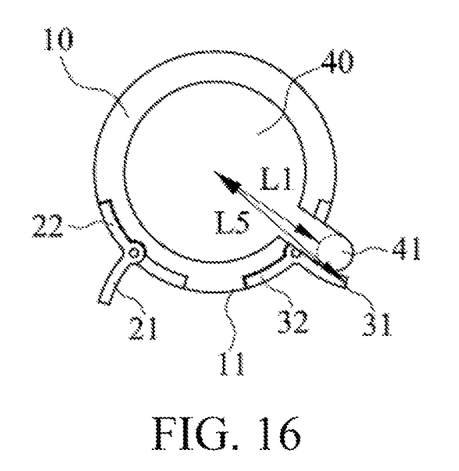

Then, in another embodiment, if the pushing structure 41 is at a position shown in FIG. 15, the first stop portion 21 and the third stop portion 31 both fit the peripheral portion 11, a force F4 is applied to the driving member 40 to drive the driving member 40 to rotate in the second rotating direction R2, because the third stop portion 31 fits the peripheral portion 11, the pushing structure 41 of the driving member 40 pushes and passes through the fourth stop portion 32 of the second positioning member 30. At this time, because the first stop portion 21 fits the peripheral portion 11, the pushing structure 41 pushes and passes through the second stop portion 22 of the first positioning member 20 until stopping at the third stop portion 31 of the second positioning member 30 as shown in FIG. 16. Thus, by changing the position at which the pushing structure 41 of the driving member 40 initially stops, the rotatable angle is changed.

Figure 14:
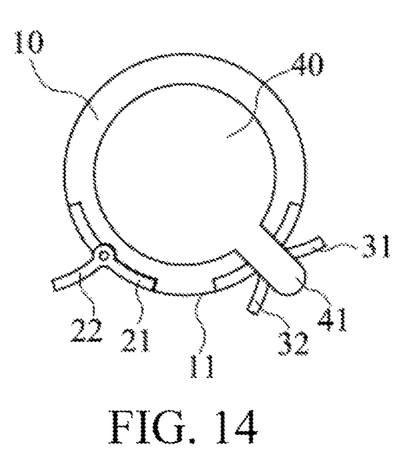

In addition, according to the embodiment, the first stop portion 21 only receives the push of the driving member 40 in the first rotating direction R1 (as shown in FIG. 12) and rotates to fit the peripheral portion 11 (as shown in FIG. 14). The third stop portion 31 only receives the push of the driving member 40 in the first rotating direction R1 (as shown in FIG. 13 and FIG. 14) and rotates to fit the peripheral portion 11 (as shown in FIG. 15).

Referring to FIG. 15, if the minimum linear distance from the center of the annular base 10 to the inner surface of the pushing structure 41 is L1, when the first stop portion 21 of the first positioning member 20 fits the peripheral portion 11 of the annular base 10, the linear distance from the center of the annular base 10 to the end of the second stop portion 22 of the first positioning member 20 is L4. The second stop portion 22 of the first positioning member 20 is used as the stop in the embodiment, and L1 is smaller than L4, so that when the pushing structure 41 is stopped at the second stop portion 22 of the first positioning member 20, the second stop portion 22 effectively stops the pushing structure 41.

Referring to FIG. 16, when the fourth stop portion 32 of the second positioning member 30 fits the peripheral portion 11 of the annular base 10, the linear distance from the center of the annular base 10 to the end of the third stop portion 31 of the second positioning member 30 is L5. In another embodiment, the third stop portion 31 of the second positioning member 30 is used as the stop, and L1 is smaller than L5, so that when the pushing structure 41 is stopped at the third stop portion 31 of the second positioning member 30, the third stop portion 31 effectively stops the pushing structure 41.

In order to simultaneously satisfy the various patterns described above and facilitate the manufacturing and management of the first positioning member 20 and the second positioning member 30, the first stop portion 21, the second stop portion 22, the third stop portion 31 and the fourth stop portion 32 are all in an arc shape of the same size. Furthermore, the included angle between the first stop portion 21 and the second stop portion 22 and the included angle between the third stop portion 31 and the fourth stop portion 32 are also the same. Thus, the first positioning member 20 and the second positioning member 30 that are identical are obtained, and the number of components to be manufactured and managed is reduced.

Through the above embodiments, by providing the first positioning member and the second positioning member as a stop positioning structure, the driving member rotates within a specific range relative to the annular base, but after a certain angle of rotation in each rotating direction, the pushing structure of the driving member does not continue to rotate under the stop of the first positioning member or the second positioning member. Therefore, the rotating device is limited to rotate within a certain rotation angle. An upper and lower double-layer structure or an upper and lower multi-layer structure is not needed, so that the rotating device is made thin. In addition, only the first positioning member and the second positioning member are needed to be arranged on the peripheral portion of the annular base, the pushing structure of the driving member rotates around the annular base, and if the annular base is miniaturized, the first positioning member, the second positioning member and the driving member are also miniaturized, so that the overall size is reduced.

The embodiments and/or implementations described above are merely illustrative of preferred embodiments and/or implementations of the application, and are not intended to limit the implementations of the application in any form. The embodiments may be changed a little or modified into other equivalent embodiments by those skilled in the art without departing from the scope of the technical means disclosed by the application, and these changes or modifications shall be regarded as substantially same technologies or embodiments of the application.

What is claimed is:

1. A rotating device, comprising:
an annular base;
a first positioning member pivoted to a peripheral portion of the annular base, the first positioning member comprising a first stop portion and a second stop portion connected to the first stop portion, the first stop portion being bent in a first rotating direction, and the second stop portion being bent in a second rotating direction;
a second positioning member pivoted to the peripheral portion of the annular base, the second positioning member comprising a third stop portion and a fourth stop portion connected to the third stop portion, the third stop portion being bent in the first rotating direction, and the fourth stop portion being bent in the second rotating direction; and
a driving member rotatably assembled to the annular base, wherein the driving member comprises a pushing structure, the pushing structure protrudes from the peripheral portion, and the driving member is driven by a force to drive the pushing structure to rotate around the outer edge of the peripheral portion in the first rotating direction or the second rotating direction; when the pushing structure rotates in the first rotating direction, the first stop portion and the third stop portion fit the peripheral portion in response to the push of the pushing structure, and the second stop portion and the fourth stop portion stop the pushing structure; and when the pushing structure rotates in the second rotating direction, the second stop portion and the fourth stop portion fit the peripheral portion in response to the push of the pushing structure, and the first stop portion and the third stop portion stop the pushing structure; wherein a rotation axis of the first positioning member, the second positioning member and the driving member are parallel to each other.

2. The rotating device according to claim 1, wherein when the first stop portion fits the peripheral portion of the annular base, the second stop portion moves away from and protrudes from the peripheral portion; when the second stop portion fits the peripheral portion of the annular base, the first stop portion moves away from and protrudes from the peripheral portion;

when the third stop portion fits the peripheral portion of the annular base, the fourth stop portion moves away from and protrudes from the peripheral portion; and when the fourth stop portion fits the peripheral portion of the annular base, the third stop portion moves away from and protrudes from the peripheral portion.

3. The rotating device according to claim 2, wherein when the pushing structure rotates in the first rotating direction and the second stop portion fits the peripheral portion, the pushing structure passes through the second stop portion and pushes the first stop portion, and after the first stop portion fits the peripheral portion of the annular base, in response to the third stop portion or the fourth stop portion to fit the peripheral portion, the pushing structure is stopped at the fourth stop portion or pushes the third stop portion, so that the third stop portion fits the peripheral portion of the annular base; and when the pushing structure rotates in the second rotating direction and the third stop portion fits the peripheral portion, the pushing structure passes through the third stop portion and pushes the fourth stop portion, and after the fourth stop portion fits the peripheral portion of the annular base, in response to the second stop portion or the first stop portion to fit the peripheral portion, the pushing structure is stopped at the first stop portion or pushes the second stop portion, so that the second stop portion fits the peripheral portion of the annular base.

4. The rotating device according to claim 1, wherein the minimum linear distance from the center of the annular base to the inner surface of the pushing structure is shorter than the linear distance from the center of the annular base to the end of the first stop portion of the first positioning member when the second stop portion of the first positioning member fits the peripheral portion of the annular base, and shorter than the linear distance from the center of the annular base to the end of the fourth stop portion of the second positioning member when the third stop portion of the second positioning member fits the peripheral portion of the annular base.

5. The rotating device according to claim 1, wherein the first stop portion, the second stop portion, the third stop portion and the fourth stop portion are arc-shaped, and have radians corresponding to the peripheral portion of the annular base.

6. The rotating device according to claim 1, wherein the included angle between the first stop portion and the second stop portion and the included angle between the third stop portion and the fourth stop portion are more than or equal to 90 degrees.

7. The rotating device according to claim 1, wherein the driving member further comprises a pivot shaft and an extending portion, the pivot shaft is rotatably pivoted to the annular base, one end of the extending portion is connected to the pivot shaft, and the other end is connected to the pushing structure.

8. The rotating device according to claim 1, wherein the driving member further comprises a disc, a pivot shaft and an extending portion, the pivot shaft is arranged in the center of the disc, the pivot shaft penetrates through the annular base such that the disc is rotatably arranged on the annular base, one end of the extending portion is connected to the disc, and the other end is connected to the pushing structure.

9. The rotating device according to claim 8, wherein the diameter of the disc is smaller than that of the annular base.

10. A rotating device, comprising:
an annular base;
a first positioning member pivoted to a peripheral portion of the annular base, the first positioning member comprising a first stop portion and a second stop portion connected to the first stop portion, the first stop portion being bent in a first rotating direction, and the second stop portion being bent in a second rotating direction;
a second positioning member pivoted to the peripheral portion of the annular base, the second positioning member comprising a third stop portion and a fourth stop portion connected to the third stop portion, the third stop portion being bent in the first rotating direction, and the fourth stop portion being bent in the second rotating direction; and
a driving member rotatably assembled to the annular base, wherein the driving member comprises a pushing structure, the pushing structure protrudes from the peripheral portion, and the driving member is driven by a force to drive the pushing structure to rotate around the outer edge of the peripheral portion in the first rotating direction or the second rotating direction; when the pushing structure rotates in the first rotating direction, the first stop portion and the third stop portion fit the peripheral portion in response to the push of the pushing structure, and the second stop portion and the fourth stop portion stop the pushing structure; and when the pushing structure rotates in the second rotating direction, the second stop portion and the fourth stop portion fit the peripheral portion in response to the push of the pushing structure, and the first stop portion and the third stop portion stop the pushing structure, wherein the peripheral portion of the annular base is recessed with two receiving grooves, a pivot is arranged in each receiving groove in a protruding manner, and the first positioning member and the second positioning member are respectively received in the receiving grooves and pivoted to the pivots and rotate about the pivots.

11. The rotating device according to claim 10, wherein when fitting the peripheral portion of the annular base, the first stop portion, the second stop portion, the third stop portion or the fourth stop portion is completely received in the corresponding receiving grooves, and does not protrude from the peripheral portion.

12. A rotating device, comprising:
an annular base;
a first positioning member pivoted to a peripheral portion of the annular base, the first positioning member comprising a first stop portion and a second stop portion connected to the first stop portion, the first stop portion being bent in a first rotating direction, and the second stop portion being bent in a second rotating direction;
a second positioning member pivoted to the peripheral portion of the annular base, the second positioning member comprising a third stop portion and a fourth stop portion connected to the third stop portion, the third stop portion being bent in the first rotating direction, and the fourth stop portion being bent in the second rotating direction; and
a driving member rotatably assembled to the annular base, wherein the driving member comprises a pushing structure, the pushing structure protrudes from the peripheral portion, and the driving member is driven by a force to drive the pushing structure to rotate around the outer edge of the peripheral portion in the first rotating direction or the second rotating direction; when the pushing structure rotates in the first rotating direction, the first stop portion and the third stop portion fit the peripheral portion in response to the push of the pushing structure, and the second stop portion and the fourth stop portion stop the pushing structure; and when the pushing structure rotates in the second rotating direction, the second stop portion and the fourth stop portion fit the peripheral portion in response to the push of the pushing structure, and the first stop portion and the third stop portion stop the pushing structure, wherein the minimum linear distance from the center of the annular base to the inner surface of the pushing structure is shorter than the linear distance from the center of the annular base to the end of the second stop portion of the first positioning member when the first stop portion of the first positioning member fits the peripheral portion of the annular base, and shorter than the linear distance from the center of the annular base to the end of the third stop portion of the second positioning member when the fourth stop portion of the second positioning member fits the peripheral portion of the annular base.

* * * * *